(12) United States Patent
Verykios et al.

(10) Patent No.: US 11,673,803 B2
(45) Date of Patent: Jun. 13, 2023

(54) CATALYTIC MATERIALS FOR PYROLYSIS OF METHANE AND PRODUCTION OF HYDROGEN AND SOLID CARBON WITH SUBSTANTIALLY ZERO ATMOSPHERIC CARBON EMISSIONS

(71) Applicants: Xenophon Verykios, Patras (GR); Stylianos Neophytides, Patras (GR)

(72) Inventors: Xenophon Verykios, Patras (GR); Stylianos Neophytides, Patras (GR)

(73) Assignees: Xenophon Verykios, Patras (GR); FOUNDATION FOR RESEARCH AND TECHNOLOGY—HELLAS / INSTITUTE OF CHEMICAL ENGINEERING SCIENCES (FORTH/ICE-HT), Patras (GR)

( * ) Notice: Subject to any disclaimer, the term of this patent is extended or adjusted under 35 U.S.C. 154(b) by 0 days.

(21) Appl. No.: 17/863,886

(22) Filed: Jul. 13, 2022

(65) Prior Publication Data

US 2022/0348460 A1   Nov. 3, 2022

Related U.S. Application Data

(62) Division of application No. 17/502,628, filed on Oct. 15, 2021, now Pat. No. 11,401,163.

(60) Provisional application No. 63/093,399, filed on Oct. 19, 2020.

(51) Int. Cl.
*C01B 3/26* (2006.01)
*C01B 32/05* (2017.01)
*C01B 3/30* (2006.01)

(52) U.S. Cl.
CPC .............. *C01B 3/26* (2013.01); *C01B 3/30* (2013.01); *C01B 32/05* (2017.08); *C01B 2203/1058* (2013.01); *C01B 2203/1076* (2013.01)

(58) Field of Classification Search
CPC .. C01B 3/26; C01B 3/30; C01B 32/05; C01B 2203/1058; C01B 2203/1076
See application file for complete search history.

(56) References Cited

U.S. PATENT DOCUMENTS

| 3,980,584 A | 9/1976 | Dronov et al. |
| 10,179,326 B2 | 1/2019 | Basset et al. |
| 11,066,299 B1 | 7/2021 | Fadhel et al. |

(Continued)

FOREIGN PATENT DOCUMENTS

| CN | 106241735 A | 12/2016 | |
| CN | 108187707 A * | 6/2018 | ............ B01J 23/002 |

(Continued)

OTHER PUBLICATIONS

Machine Translation of CN108187707A1 (Oct. 11, 2022) (Year: 2022).*

(Continued)

*Primary Examiner* — Matthew J Merkling
(74) *Attorney, Agent, or Firm* — Carter, DeLuca & Farrell LLP; George Likourezos

(57) ABSTRACT

A catalyst for the pyrolysis of a hydrocarbon, such as methane or natural gas, includes a pile of waste-product configured to facilitate the decomposition of the hydrocarbon into hydrogen and carbon. The waste-product is one of bauxite residue, mill scale, or slag. The pile of waste product may be broken down into a powder or piece-meal form.

20 Claims, 5 Drawing Sheets

(56) References Cited

U.S. PATENT DOCUMENTS

| 2018/0065850 | A1 | 3/2018 | Cornejo et al. |
| 2021/0087484 | A1 | 3/2021 | Lan et al. |
| 2021/0170352 | A1 | 6/2021 | Rivest et al. |
| 2021/0380406 | A1 | 12/2021 | Zhou et al. |

FOREIGN PATENT DOCUMENTS

| CN | 215101978 | U | 12/2021 |
| DE | 102009041659 | A1 | 5/2010 |
| DE | 102013112205 | A1 | 5/2014 |
| EP | 0969104 | A1 | 1/2000 |
| KR | 100880513 | B1 | 1/2009 |
| WO | 2018216886 | A1 | 11/2018 |

OTHER PUBLICATIONS

Konieczny, "Catalyst development for the thermocatalytic decomposition of methane to hydrogen", International Journal of Hydrogen Energy, vol. 33, (2008) pp. 264-272) (Year: 2008).*

R. Dhir, et al, "Sustainable Construction Materials: Copper Slag", Chapter 3—Production and Properties of Copper Slag pp. 27-86 (2017).

M.Chockalingam, et al, "Scope for Reuse of Copper Slag in Concrete—A Review", International Journal of Civil Engineering and Technology (IJCIET) ISSN 0976-6308 (Print), ISSN 0976-6316(Online) vol. 4, Issue 6, (Nov.-Dec. 2013).

J. Safarian, et al, Sustainability in Alumina Production from Bauxite, Sustainable Industrial Processing Summit and Exhibition (2016).

H. Yi, et al, "An Overview of Utilization of Steel Slag, Procedia Environmental Sciences" 16 pages (2012).

Purwanto H et al "Hydrogen production from biogas using hot slag", International Journal of Hydrogen Energy, Elsevier, Amsterdam, NL, vol. 31, No. 4, Mar. 1, 2006 (Mar. 1, 2006), pp. 491-495, [retrieved on Mar. 1, 2006].

Balakrishnan M. et al "Hydrogen production from methane in the presence of red mud-making mud magnetic", Green Chemistry, vol. 11, No. 1, Jan. 1, 2009 (Jan. 1, 2009), pp. 42-47.

International Search Report dated Jan. 28, 2022 for corresponding International Patent Appplication No. PCT/EP2021/078865 (14 pages).

* cited by examiner

CATALYTIC MATERIALS FOR PYROLYSIS OF METHANE AND PRODUCTION OF HYDROGEN AND SOLID CARBON WITH SUBSTANTIALLY ZERO ATMOSPHERIC CARBON EMISSIONS

CROSS-REFERENCE TO RELATED APPLICATIONS

The application is a divisional application of U.S. application Ser. No. 17/502,628, filed Oct. 15, 2021, entitled "CATALYTIC MATERIALS FOR PYROLYSIS OF METHANE AND PRODUCTION OF HYDROGEN AND SOLID CARBON WITH SUBSTANTIALLY ZERO ATMOSPHERIC CARBON EMISSIONS", the entirety of which is incorporated herein by reference.

TECHNICAL FIELD

This disclosure relates to the production of hydrogen and solid carbon materials via the pyrolysis of a hydrocarbon. In particular, the disclosure relates to catalysts for the pyrolysis of methane or natural gas, the catalysts including waste-products.

BACKGROUND

Decarbonization of the energy sector is of paramount importance for environmental concerns as related to global warming and climate change. Hydrogen, particularly pure $H_2$, is a well-known carbon-free energy carrier that is viewed by many as a promising alternative to fossil fuels and for de-carbonizing the energy sector, especially as it would be used in the production of electricity and transportation. The advent of fuel cell technologies is promoting this alternative because fuel cells operate on hydrogen with high electrical efficiency and other environmental benefits.

However, hydrogen is not found in its free molecular state on earth. Thus, it would have to be extracted from a compound that contains hydrogen. The most mature technology involves extracting hydrogen from water (water splitting) via electrolysis. This process is energy-intensive since the H—O bonds in water are very stable and large amounts of energy are required to break them. To produce one cubic meter of hydrogen via water electrolysis, more than 4 kW-h of electricity is required. Exacerbating the issue is the source of electricity which is consumed in the production of pure $H_2$ and the environmental implications of its production. Since in many parts of the world electricity production is associated with huge amounts of carbon emissions and emissions of other atmospheric pollutants, the environmental footprint of this technology is questionable.

An alternative approach is to extract hydrogen from a hydrocarbon such as methane ($CH_4$) which is the main constituent (>90-95%) of natural gas. While this is a viable process and technologically mature, the process emits carbon dioxide ($CO_2$), which is the result of the carbon contained in the hydrocarbon. Although the quantity of $CO_2$ emitted may be small, it is not zero. However, since the global supply of natural gas is very large and the carbon emissions low, it is a technology that can be used as a transient between the full-carbon and the zero-carbon approaches.

Another alternative process to produce "blue hydrogen," i.e., hydrogen approximately free of any carbon emissions, is the decomposition or pyrolysis of methane or natural gas into gaseous hydrogen and solid carbon. Such a process produces the desired pure hydrogen, which may be used directly in fuel cells for electricity production, with limited to no $CO_2$ emissions as described in U.S. Pat. No. 6,670,058 to Muradov. The solid carbon by-product can either be used in industrial processes or it can be disposed of easily underground. If biogas (or bio-methane) is used instead of natural gas, then the process is of "negative" carbon emission since the carbon contained in bio-methane is carbon absorbed from the atmosphere. The energy "penalty" of this process, defined as the energy losses from methane decomposition to produce hydrogen and using the hydrogen in fuel cells to produce electricity, is less than 15% as compared to electricity production with natural gas in a turbine. If the produced carbon is utilized in an industrial process, then the penalty is less or even "negative".

The pyrolysis of methane requires very high temperatures, generally greater than 1200° C. A suitable catalyst can be used to reduce the required activation temperature of methane necessary for pyrolysis. In the presence of suitable catalysts, methane decomposition can occur at 800-900° C. The most promising catalysts contain nickel (Ni), iron (Fe), and cobalt (Co), supported on metal oxide materials such as aluminum oxide ($Al_2O_3$), magnesium oxide (MgO), and others. However, the decomposition of methane on such catalysts is not practical and economically feasible since the catalyst accumulates carbon on its surface and deactivates after short periods of use. The removal of the accumulated carbon and re-use of the catalyst is complicated and expensive. Thus, the solid material including the catalyst and the accumulated carbon is often disposed of together. Since the cost of the catalyst is considerable, this is detrimental to the economic feasibility of the process. Thus, catalysts that are practical, economically feasible, and effective at reducing the temperature requirements for the pyrolysis of methane are desired.

SUMMARY

The present disclosure relates to a catalyst for the pyrolysis of methane including a pile of waste-product. The waste-product is configured to facilitate the decomposition of a hydrocarbon into hydrogen and carbon. The waste-product is one of refined bauxite residue, mill scale, or slag.

In an aspect, the catalyst may include a substructure layered with the waste product.

In aspects, the substructure may be made at least in part of the waste-product.

In other aspects, the waste-product may be enhanced by nickel, cobalt, or iron additives.

In further aspects, the substructure may be made at least in part of nickel, cobalt, iron, aluminum oxide, or magnesium oxide.

In an aspect, the pile of waste product is broken down into a powder or piece-meal form.

In aspects, the waste-product may be slag comprising at least one of steel slag, copper slag, or nickel slag.

Another aspect of this disclosure provides a method for manufacturing hydrogen. The method includes: passing a hydrocarbon over a waste-product catalyst; heating the hydrocarbon and waste-product catalyst; thermocatalytically decomposing the hydrocarbon into hydrogen and solid carbon; and collecting the hydrogen in a container.

In aspects, the passing of a hydrocarbon over a waste-product catalyst may include passing natural gas or methane over a waste-product catalyst.

In additional aspects, the method may further include collecting solid carbon deposited on the waste-product catalyst.

In other aspects, the passing of a hydrocarbon over a waste-product catalyst may include passing the hydrocarbon over a catalytic pile of waste-product.

In disclosed aspects, the passing of a hydrocarbon over a waste-product catalyst may include passing the hydrocarbon over a waste-product catalyst that may include at least one of bauxite residue, slag, or mill scale.

In yet other alternatives, the passing of a hydrocarbon over a waste-product catalyst includes passing the hydrocarbon over a waste-product catalyst that may include a substructure. A layer of waste-product material may be an outer layer on the substructure.

In further aspects, the waste product catalyst may be contained in a reactor.

In even further aspects, the reactor is a fixed bed, fluidized bed, moving bed, trickle bed, rotating bed, or slurry reactor.

In disclosed aspects, the method may include processing the waste-product catalyst into a powder or piece-meal form.

In aspects, the method may include heating the hydrocarbon and waste-product catalyst from about 750° C. to about 950° C.

In aspects, the method may include heating the hydrocarbon and waste-product catalyst from about 500° C. to about 1300° C.

These and other features and advantages of the present disclosure will become apparent from the following description and the associated drawings.

BRIEF DESCRIPTION OF THE DRAWINGS

A better understanding of the features and advantages of the present disclosure will be obtained by reference to the following detailed description that sets forth illustrative aspects and the accompanying drawings of which.

DETAILED DESCRIPTION

Figure 2:
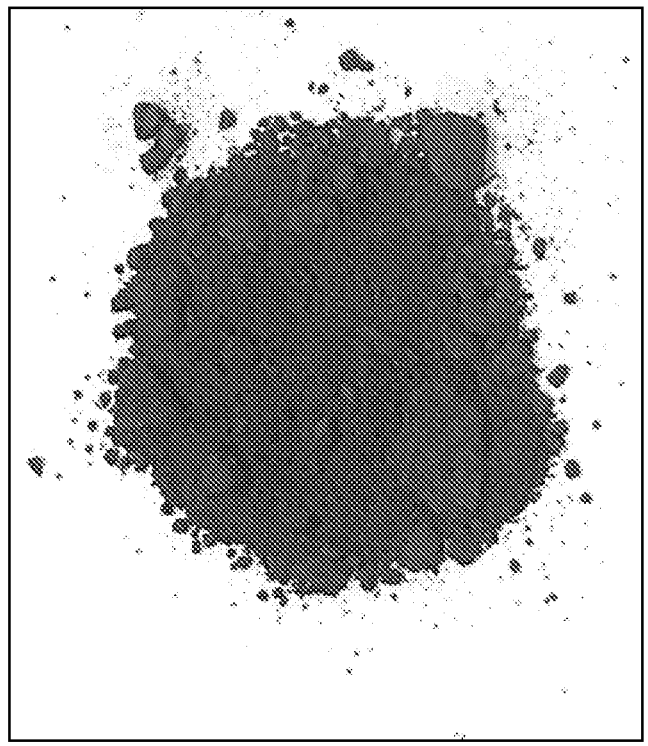
FIG. 2 is an image of a pile of mill scale catalytic material.

Although the present disclosure will be described in terms of specific embodiments, it will be readily apparent to those skilled in this art that various modifications, rearrangements, and substitutions may be made without departing from the spirit of the present disclosure.

The description herein presents numerous specific details included to provide a thorough understanding of the present disclosure. It will be apparent, however, to one skilled in the art that the present disclosure can be practiced without some or all of these specific details. On the other hand, well-known process steps, procedures, and structures are not described in detail as to not unnecessarily obscure the present disclosure.

Production of pure hydrogen and solid carbon materials by the process of pyrolysis, or thermocatalytic decomposition, of methane is integral towards the development of a hydrogen economy. Improving the source and characteristics of catalysts used in the reaction is an important aspect of improving the feasibility of hydrogen production from natural gas or methane, the latter a principal component of natural gas. Enhancements in catalytic characteristics are generally made with respect to the reaction rate, minimizing operating temperatures, and the ability to retain thermo-chemical stability amid huge nanocarbon deposition. Accordingly, various metal and carbon-based catalysts were introduced. Metal-based catalysts are superior to carbon catalysts in terms of their hydrogen production percentage and reaction rate.

Transition metals, particularly Ni—, Fe—, and Co-based catalysts are often used to improve the catalytic reaction during pyrolysis. Ni-based catalysts are distinguished from the metal-based catalysts because of their relatively low-cost, low-toxicity, superior activity, stability, and environmentally friendly characteristics. Metal-based catalysts have a longer catalytic lifespan by upholding a nanocarbon formation mechanism which retains the active site of the metal on the top of the catalyst towards a reaction medium. The growth mechanism of nanocarbon or solid carbon products from the pyrolysis process involves the diffusion of deposited carbon through the active metal site. The diffused nanocarbons, then, precipitate on the other side of the metal particle to form longer carbon filaments.

The catalytic activity and stability of a catalyst used in the process and the characteristics of as produced nanocarbon are very relevant in thermocatalytic decomposition (TCD) since both play a vital role in determining the overall yield and structure of the solid carbon by-product and hydrogen produced. Solid carbon accumulates on the catalyst until the solid carbon saturates the catalyst thereby deactivating the catalyst. When the deactivation is nearly complete, the catalyst along with the solid carbon which it contains can be disposed of in a suitable manner or it can be used in other processes.

The solid carbon byproduct of the pyrolysis or TCD of methane is generally in the form of nanocarbons, graphitic carbons, or carbon nanotubes. This provides additional economic and, in some applications, environmental benefits (since it reduces the need to dispose of otherwise useless solid carbon) to producing hydrogen via pyrolysis or TCD. For example, the graphitic carbon by-products may be used for a variety of industrial and consumer applications, such as the production of pencil tips, high temperature crucibles, dry cells, electrodes, or as a lubricant, among many other applications known to those of ordinary skill in the art. Carbon nanotubes (CNTs) are cylinders of one or more layers, known as single-wall carbon nanotubes (SWCNTs) and multi-walled carbon nanotubes (MWCNTs) of graphene (lattice) of diameters between 0.8 to 2 nm for SWCNTs and 5 to 20 nm for MWCNTs. CNTs are structural materials of desirable properties and are used in applications including, but not limited to, energy storage, device modeling, automotive parts, boat hulls, sporting goods, water filters, thin-film electronics, coatings, actuators, and electromagnetic shields.

Providing low cost, environmentally friendly, and abundant catalytic materials mitigates the need for improving the characteristics of expensive catalytic materials or developing methods for re-using the catalysts.

The present disclosure describes a family of "waste-product" catalysts, or waste-products that form the catalytic material, which can promote the thermocatalytic decomposition (pyrolysis) of methane or natural gas into hydrogen and solid carbon and which may be used for low, about zero, or 'negative' carbon production of pure hydrogen. The catalysts are carbon neutral, allow for carbon consumption, and are environmentally friendly since they are composed of waste materials, which would have to be disposed of anyway. The waste-product catalysts are produced from the waste materials and allow for the pyrolysis or thermocatalytic decomposition (TCD) of methane at lower temperatures than when the catalysts are not used. Additionally, due to the abundance of these waste materials, replacing spent "waste-product" catalyst is economical and feasible since the material would otherwise be disposed of, for example, in a landfill. This thus mitigates the issue of solid carbon deposits building up on and deactivating the often more expensive catalytic material. Waste product catalysts may include slag, mill scale, bauxite residue or similar waste products that include sufficient levels of iron for TCD.

The waste-product catalysts serve to crack open the methane or natural gas. When these materials are used as waste-product catalysts in the TCD of methane, the following reaction takes place:

$$CH_4 \rightarrow 2H_2 + C \quad \Delta H_o \approx 75 \text{ kJ/mol} \quad \text{(Equation 1)}$$

Figure 1:
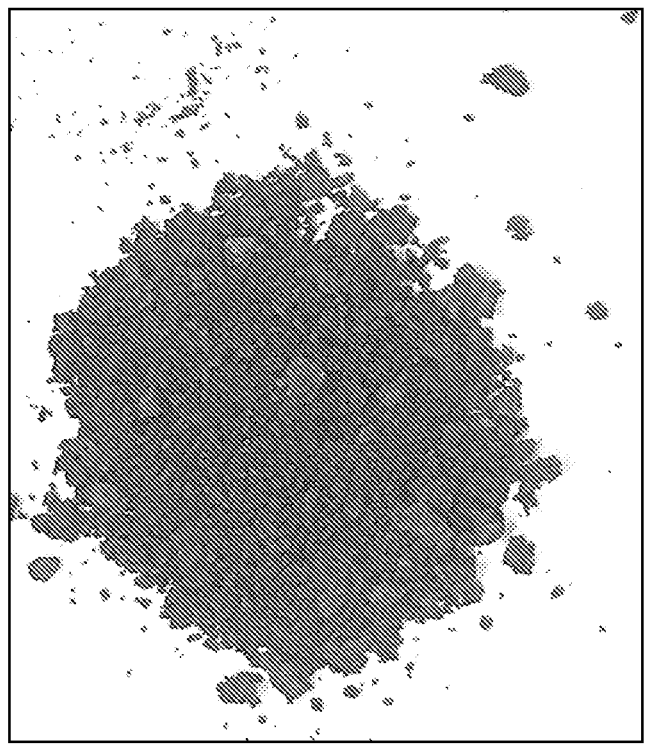
FIG. 1 is an image of a pile of bauxite-residue catalytic material.

With reference to FIG. 1, a waste-product catalyst is produced from bauxite residue (bauxite tailings), commonly referred to as "red mud." The red mud is dried and used in a "powdered" or "piece-meal" form as a catalyst. Red mud is primarily composed of iron oxides. Bauxite residue is a by-product of a process of extracting aluminum from bauxite ore, specifically, via a process known by those of ordinary skill in the art of aluminum extraction as the Bayer process.

In the Bayer process, strip-mined bauxite ore is treated with sodium hydroxide, otherwise known as hot caustic soda, which selectively dissolves aluminum from an array of other mineralized metals. The end products are alumina ($Al_2O_3$), which is used to produce aluminum metals, and bauxite residue. For every ton of alumina produced approximately 1-1.5 tons of red mud is produced. Generally, the red mud produced is stored in ponds, has few other uses, and is not environmentally friendly. Given that the annual production of alumina, as of 2018, was approximately 126 million tons, resulting in the generation of 160 million tons of red mud, an appropriate and environmentally friendly use of red mud is desired.

Creating a waste-product catalyst out of red mud not only provides for efficient and effective pyrolysis to be performed but also re-purposes the waste-product from the Bayer process, reducing the environmental impact of both the pyrolysis process and the Bayer process. Further, the abundance of red mud makes it an attractive economical material for a catalyst.

Bauxite residue may be dried in various ways, such as kiln-dried or sun-dried, and subsequently processed to form a "powder" or "piece-meal" (small chunks and pieces) catalytic pile. The dried red mud may be placed into and contained by a chemical reactor for pyrolysis. The reactor may be a fixed bed, fluidized bed, moving bed, trickle bed, rotating bed, or slurry reactor. Any suitable reactor known by those of ordinary skill in the art of chemical reactors or pyrolysis may be used. Placing the dried red mud catalytic pile directly into the chemical reactors, in addition to the carbon savings and hydrogen production, reduces the cost of producing catalytic materials, as no further processing of the catalyst is required.

In aspects, a waste-product catalyst may include a catalytic substructure coated with a layer of refined or dried red mud. In aspects, the substructure may be made from red mud and dried red mud may then be layered onto the catalytic substructure. The dried red mud may be configured to form the whole of the catalytic structure. In aspects, Nickel (Ni), Cobalt (Co), or Iron (Fe) metals or compounds may be added to the red mud to enhance catalytic performance of the red mud.

The bauxite residue may contain 30-60 wt % of iron (III) oxide ($Fe_2O_3$), 10-20 wt % of aluminum oxide ($Al_2O_3$), 3-50 wt % of silicon dioxide ($SiO_2$), 2-10 wt % of sodium oxide ($Na_2O$), 2-8 wt % of calcium oxide (CaO), and about 0-25 wt % of titanium dioxide ($TiO_2$). Additionally, trace amounts of MgO are often found in red mud. $Al_2O_3$, $SiO_2$, MgO, and $TiO_2$ are known in the art to improve catalytic performance as discussed in the journal Renewable & Sustainable Energy Reviews March 2017 article titled: "A review on methane transformation to hydrogen and nanocarbon: Relevance of catalyst characteristics and experimental parameters on yield," by Ashik et. al. In particular, $SiO_2$ as a catalyst additive is an effective material for enhancing the catalytic reaction in pyrolysis. Thus, dried bauxite residue in a "powder" or "piece-meal" pile is a desirable catalytic material.

The red mud may be refined to include desirable quantities of its respective components. The red mud may be layered on a substructure including Co, Ni, Fe, or metal oxides, such as $Al_2O_3$ or MgO. The catalytic substructure may be of any shape, size, or geometry as known by those of ordinary skill in the art. The catalytic substructure may be a cylinder, cube, bar, honeycomb, or any other desirable shape.

In another aspect of this disclosure, a waste-product catalyst includes solid particles or flakes originating as waste material from the production and processing of steel and is composed of steel without any admixtures. In aspects, the solid particles or flakes may be mill scale produced as a by-product from steel rolling processes. Mill scale is the flaky surface or thin iron oxide layer of hot rolled steel and is comprised of mixed iron oxides such as iron (II) oxide (FeO), iron (III) oxide ($Fe_2O_3$), and iron (II-III) oxide ($Fe_3O_4$, magnetite). In aspects, the mill scale waste material may be composed of about 40% to about 100% $Fe_2O_3$ or about more than 90% $Fe_2O_3$. The mill scale is collected into catalytic piles and placed in a suitable reactor, such as a fixed bed, fluidized bed, moving bed, trickle bed, rotating bed, or slurry reactor. Any suitable reactor known by those of ordinary skill in the art of chemical reactors or pyrolysis may be used.

In another aspect of this disclosure, slag, a waste-material that is a by-product left over after a metal has been separated from its raw ore may be used as all, or a portion of, the waste-product catalyst. The slag is collected into catalytic piles to form the waste-product catalyst. The slag may be broken down into "powder" or "piece-meal" form and collected into catalytic piles. The catalytic piles of slag are placed in a suitable reactor as described above regarding mill scale and red mud.

Slag is generally composed of a mixture of metal oxides and silicon dioxide (SiO2), but may also include metal sulfides, magnesium oxide (MgO), and other elemental metals. Typical compositions for various types of slag are shown in Table 1:

TABLE 1

| Type Component | Blast furnace slag | Converter slag | Electric arc furnace slag | |
|---|---|---|---|---|
| | | | Oxidizing slag | Reducing slag |
| CaO | 41.7 | 45.8 | 22.8 | 55.1 |
| SiO2 | 33.8 | 11.0 | 12.1 | 18.8 |
| T-Fe | 0.4 | 17.4 | 29.5 | 0.3 |
| MgO | 7.4 | 6.5 | 4.8 | 7.3 |
| $Al_2O_3$ | 13.4 | 1.9 | 6.8 | 16.5 |
| S | 0.8 | 0.06 | 0.2 | 0.4 |
| $P_2O_5$ | <0.1 | 1.7 | 0.3 | 0.1 |
| MnO | 0.3 | 5.3 | 7.9 | 1.0 |

The slag may be steel slags produced, for example, in the steel industry during the purification of crude iron (also called pig iron). The purification of crude iron is often done in a basic oxygen furnace (BOF) or electric arc furnace (EAF) in order to oxidize the various residual gangues which are separated by floating on the iron melt. Table 2 shows exemplary compositions by percent weight (wt %) of steel slag produced using a BOF or a EAF.

TABLE 2

| Components | BOS wt % | EAF wt % (Carbon Steel) |
|---|---|---|
| FeO | 10-35 | 15-30 |
| CaO | 30-55 | 35-60 |
| $SiO_2$ | 8-20 | 9-20 |
| $Al_2O_3$ | 1-6 | 2-9 |
| MgO | 5-15 | 5-15 |
| MnO | 2-8 | 3-8 |
| $P_2O_5$ | 0.2-2 | 0.01-0.25 |
| S | 0.05-0.15 | 0.08-0.2 |
| Cr | 0.1-0.5 | 0.1-1 |

In aspects, the slag may be Nickel slag (Ni slag). Ni slag is produced as waste material in the production of nickel metals. Nickel ore, which may be pentlandite mixed with Fe and S as $(Ni,Fe)_9S_8$ is smelted to procude a nickel matte. The nickel matte includes Nickel and iron sulfide. The nickel matte is then processed in an electric furnace where the iron in the nickel matte is oxidized and the iron may be combined with silica to produce a slag containing about 30%, or less, to about 40 wt %, or more, of FeO. A converter furnace may further purify the Nickel matte from iron oxides still in the nickel matte to produce a slag containing about 60%, or less, to about 66%, or more, of FeO. Table 3 shows exemplary compositions of Ni Slags.

TABLE 3

| Components | Electric furnace wt % | converter furnace wt % |
|---|---|---|
| FeO | 32-40 | 60-66 |
| $Fe_2O_3$ | 2-7 | 13-18 |
| CaO | 3-6 | 7-9 |
| $SiO_2$ | 32-42 | 5-8 |
| $Al_2O_3$ | 7-12 | 0.5-1.5 |
| $Cr_2O_3$ | 2-3 | 1-5 |
| MgO | 3-6 | 5-8 |

In other aspects, the slag may be Copper Slag (Cu Slag) that is produced as a waste material in the smelting process of a copper ore that exists, for example, as copper iron sulfate (e.g., $CuFeS_2$ or $Cu_5FeS_4$), that produces a copper matte. The copper matte is then processed to remove the iron, sulfur, and gangue material from the copper matte. Silica may be added to the smelt as the silica interacts with iron oxides of the copper matte to form a floating layer that can be separated from the smelt. The iron oxides mixed with silica form the Copper slag. Table 4 shows exemplary compositions of Cu Slags.

TABLE 4

| Components | wt % |
|---|---|
| $F_2O_3$ | 55-70 |
| $Al_2O_3$ | 0.5-5 |
| $SiO_2$ | 25-35 |
| CaO | 0.15-6 |

In aspects, slag or mill scale may be layered onto a catalytic substructure or form the entirety of the catalytic substructure. In aspects, a catalytic substructure may include multiple layers of slag and/or mill scale.

In another aspect of this disclosure, raw iron ore, while not a waste product, is broken into "powder" or "piecemeal" form and collected into catalytic piles for use in a chemical reactor for pyrolysis. Iron ore is generally mined for the extraction of its iron used to make steel and is typically not a waste product, but rather the raw material processed into a future product. Iron ore is a cheaper material compared to many standard catalysts in its unprocessed state. Slag and mill scale are the remains or waste product of the iron ore after it has been processed.

Slag, mill scale, and red mud provide attractive materials for creating waste-product catalysts for pyrolysis since they are materials that already require disposal and have desirable properties for pyrolysis. Table 5 below provides a comparison of the carbon accumulation ratios of red mud and mill scale versus typical catalytic materials. The higher the ratio of grams (g) of carbon per grams (g) of catalyst, the more hydrogen is produced since at the higher ratios more of the carbon is separated from the hydrocarbon (e.g., methane) and accumulated on the catalyst. The amount of carbon accumulated over the waste product catalysts, (red mud and mill scale), compares favorably to those catalysts that are conventionally used. Notably, the carbon accumulation ratio of mill scale exceeds many other catalysts.

TABLE 5

| Catalyst (Prior Art = "PA") | Pyrolysis conditions | Carbon accumulation (g carbon/g catalyst) |
|---|---|---|
| Iron Oxide (PA) | 100% CH4 @ 800° C. | 0.5 |
| Iron/Aluminum (PA) | 30% CH4 @ 700° C. | 0.8 |
| Iron/Aluminum (PA) | 100% CH4 @ 750° C. | 1.9 |
| Iron/Ceria (PA) | 30% CH4 @ 750° C. | 4.1 |
| Iron/Lanthana (PA) | 100% CH4 @ 800° C. | 8.9 |
| Iron/Ceria (PA) | 100% CH4 @ 800° C. | 9.6 |
| Red mud | 100% CH4 @ 900° C. | 1.7 |
| Mill scale | 100% CH4 @ 900° C. | 9.5 |

Figure 3:
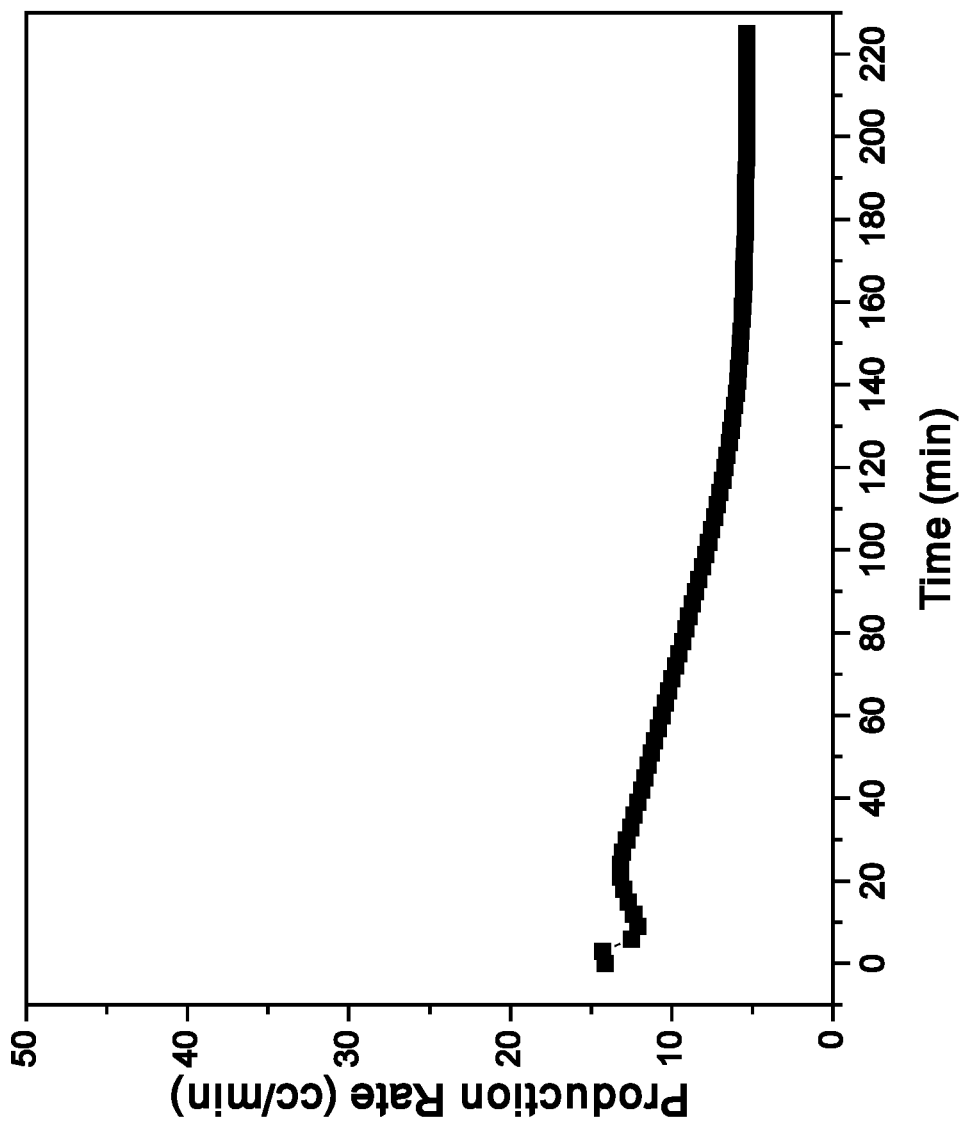
FIG. 3 is a diagram of an example production rate of hydrogen when bauxite residue is used as the catalytic material.

With reference to FIG. 3, a graph of the rate of production of hydrogen when using a dried red mud catalytic pile for the thermocatalytic decomposition of methane (pyrolysis) over time in an exemplary experiment is illustrated. Approximately pure methane was decomposed at 900° C. The dried red mud used in the example experiment was 300 milligrams (mg) by weight containing approximately 100 mg of Fe. Approximately 500 mg of carbon was deposited on the red mud after 220 minutes. About 1,850 cubic centimeters (cc) of hydrogen ($H_2$) was produced after 220 minutes, which corresponds to about 0.55 kilograms (kg) of $H_2$ per 1 kg of red mud. In the example experiment, the production rate of hydrogen via pyrolysis using the red mud catalytic pile ranged from about 15 cc per minute (cc/min) to about 5 cc/min.

Figure 4:
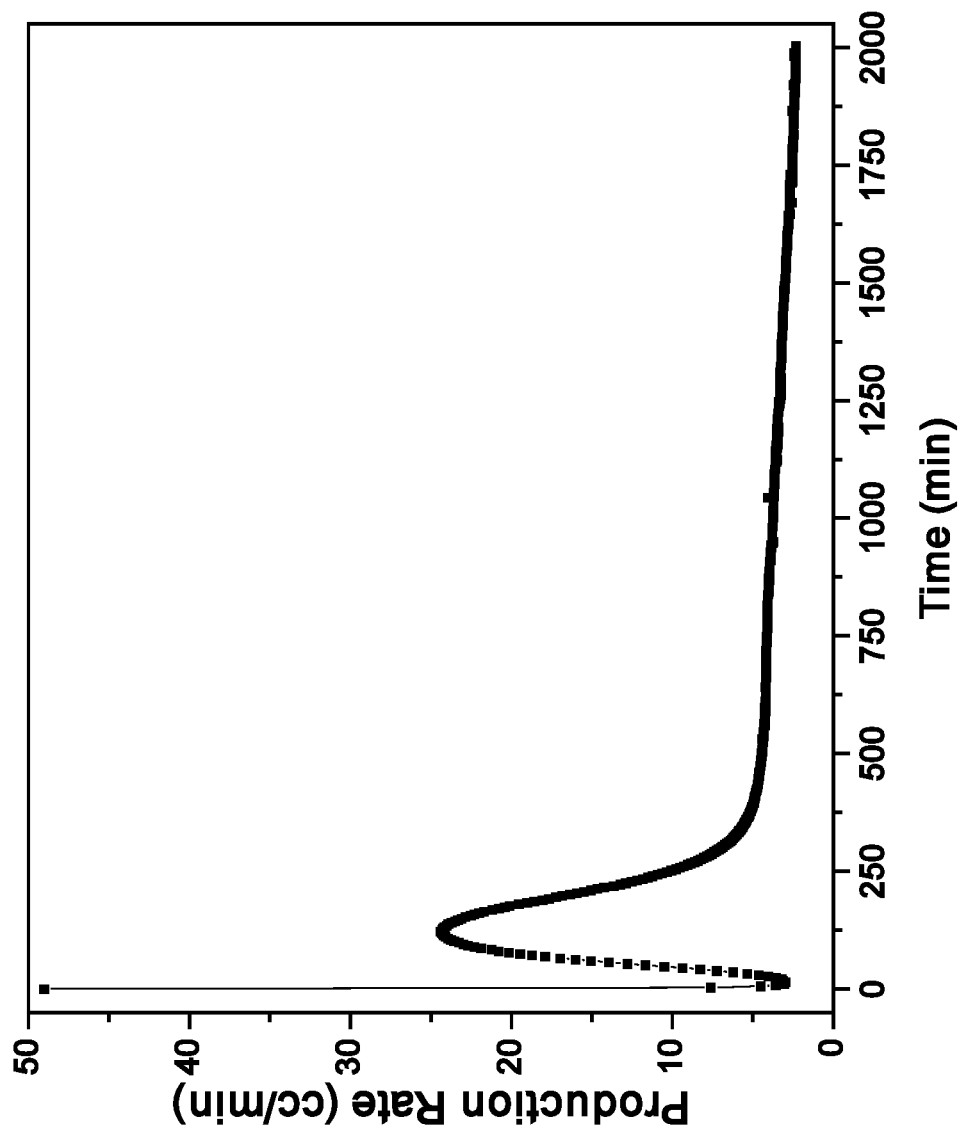
FIG. 4 is a diagram of an example production rate of hydrogen when mill scale is used as the catalytic material.
Figure 5:
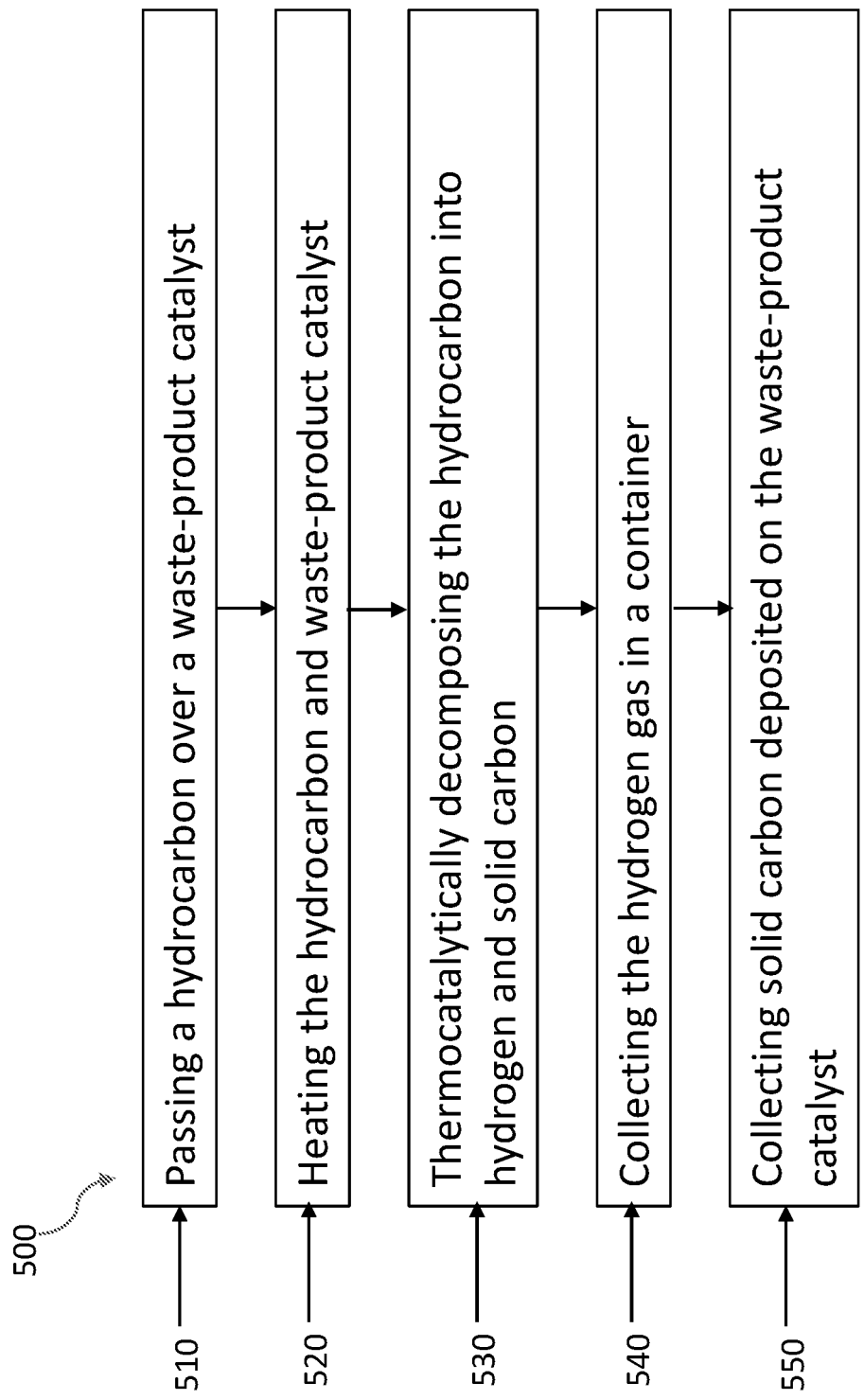
FIG. 5 is a diagram of a method for producing hydrogen, in accordance with another aspect of this disclosure.

With reference to FIG. 4, a graph of the rate of production of hydrogen when using mill scale catalytic pile for pyrolysis over time in an exemplary experiment is illustrated. Approximately pure methane was decomposed at 900° C. The mill scale catalytic pile used in the example contained was 300 mg by weight. Approximately 2,850 mg of carbon was deposited on the iron slag catalytic pile after 2,000 minutes. About 10,600 cc of $H_2$ was produced, which corresponds to about 3.15 kg of $H_2$ per 1 kg of an iron slag catalytic pile. In the first 120 minutes, the production rate of hydrogen via pyrolysis using the mill scale catalytic pile increased to a peak of about 25 cc/min, decreasing to about 3 cc/min after 2,000 minutes.

In another aspect of this disclosure, a method 500 for the production of hydrogen from a hydrocarbon, such as methane or natural gas, includes a step 510 of passing a hydrocarbon over a waste-product catalyst of this disclosure. At step 520, the method includes heating a hydrocarbon in the presence of a waste-product catalyst of the present disclosure to a desirable temperature. In aspects, the hydrocarbon may be heated from 500° C. to about 1300° C. In aspects, the hydrocarbon and waste-product catalyst are heated from about 750° C. to about 950° C. In another step 530, the hydrocarbon (e.g., methane) is decomposed into pure hydrogen and solid carbon. The method includes producing solid carbon on the surface of the waste-product catalyst. In aspects, only solid carbon, and not gaseous carbon, is produced as a by-product. In another step 540, the method includes collecting the hydrogen in a container. The method may include using the produced hydrogen to heat the catalyst. In another step 550, the method includes collecting the solid carbon from the waste-product catalyst. In aspects, the waste-product catalyst is a catalytic pile including at least one of red mud, mill scale, or slag. In aspects, the solid carbon and waste-product catalyst is disposed of in the ground to prevent carbon from escaping into the atmosphere.

Figure 6:
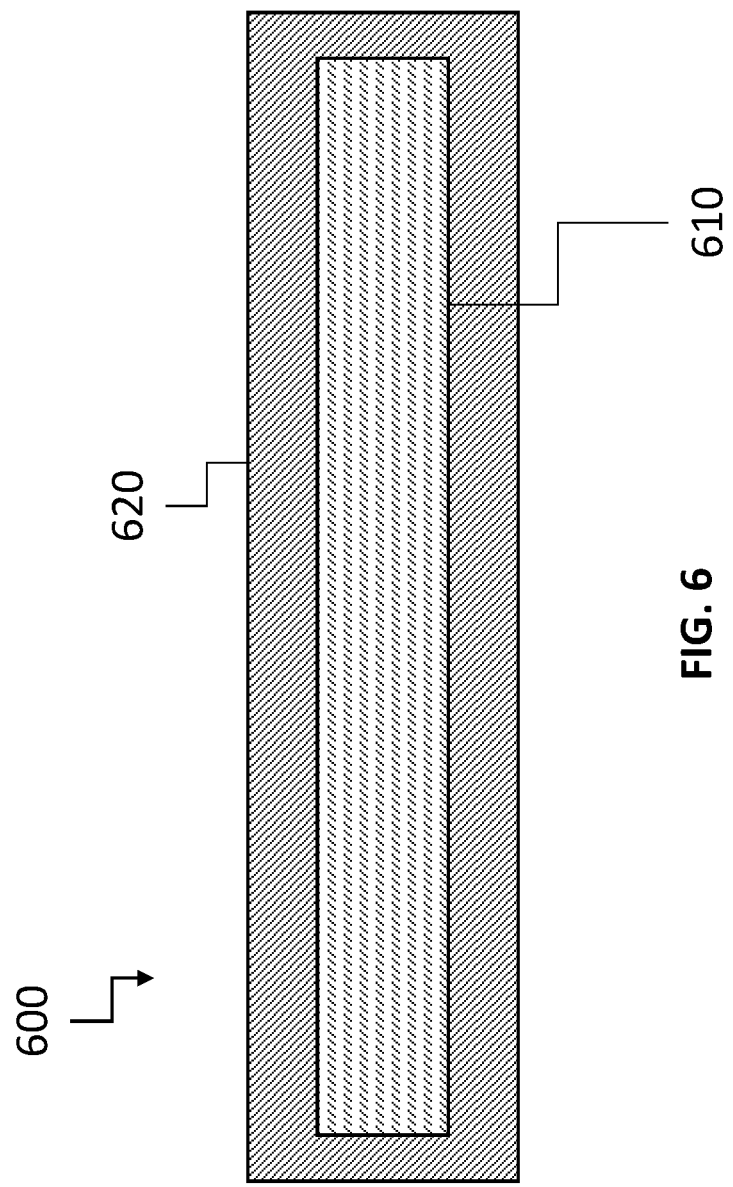
FIG. 6 is a sectional view of a waste-product catalyst in the shape of a flat bar.

With reference to FIG. 6, an illustrative waste-product catalyst 600 includes a substructure 610 and a waste-product outer layer 620. The substructure 610 may be made from any suitable material, such as Ni, Co, or Fe, metal oxides such as MgO or $Al_2O_3$, or non-metals such as ceramics. The waste-product layer 620 may include one or more waste-products such as bauxite residue, slag, or mill scale. In aspects, the waste-product layer 620 may include multiple sublayers of waste-products. Additives may be mixed with the waste-products to enhance the ability of the waste-products to facilitate pyrolysis and collect solid carbon build-up. While FIG. 6 shows a waste-product catalyst in the shape of a bar any suitable shape or structure may be used. In aspects, the substructure 610 is configured to hold a waste-product catalytic pile. In aspects, the waste-product layer 620 is a waste-product catalytic pile disposed on an upper surface of the substructure 610.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A method for producing hydrogen gas and solid carbon, comprising:
    passing a hydrocarbon over a waste-product catalyst, wherein the waste-product catalyst is nickel slag including about 5% to about 8% $SiO_2$ by weight or about 32% to about 42% $SiO_2$ by weight;
    heating the hydrocarbon and waste-product catalyst;
    thermocatalytically decomposing the hydrocarbon into hydrogen and solid carbon; and
    collecting the hydrogen in a container.

2. The method for producing hydrogen gas and solid carbon of claim 1, wherein passing the hydrocarbon over the waste-product catalyst includes passing natural gas or methane over the waste-product catalyst.

3. The method for producing hydrogen gas and solid carbon of claim 1, further comprising collecting solid carbon deposited on the waste-product catalyst.

4. The method for producing hydrogen gas and solid carbon of claim 1, wherein passing a hydrocarbon over a waste-product catalyst includes passing the hydrocarbon over a catalytic pile of waste-product.

5. The method for producing hydrogen gas and solid carbon of claim 4, wherein passing the hydrocarbon over the waste-product catalyst includes passing the hydrocarbon over the waste-product catalyst that includes:
    a substructure; and
    a layer of waste-product material as an outer layer on the substructure.

6. The method for producing hydrogen gas and solid carbon of claim 1, wherein the waste product catalyst is contained in a reactor.

7. The method for producing hydrogen gas and solid carbon of claim 5, wherein the reactor is a fixed bed, fluidized bed, moving bed, trickle bed, rotating bed, or slurry reactor.

8. The method for producing hydrogen gas and solid carbon of claim 1, further including a step of processing the waste product catalyst into a powder or piece-meal form.

9. The method for producing hydrogen gas and solid carbon of claim 1, wherein the hydrocarbon and waste product catalyst are heated from about 750° C. to about 950° C.

10. The method for producing hydrogen gas and solid carbon of claim 1, wherein the hydrocarbon and waste product catalyst are heated from about 500° C. to about 1300° C.

11. The method for producing hydrogen gas and solid carbon of claim 1, wherein the solid carbon is at least one of graphite or graphene.

12. A method for producing hydrogen gas and solid carbon, comprising:
- passing a hydrocarbon over a waste-product catalyst, wherein the waste-product catalyst is copper slag including about 25% to about 35% $SiO_2$ by weight;
- heating the hydrocarbon and waste-product catalyst;
- thermocatalytically decomposing the hydrocarbon into hydrogen and solid carbon; and
- collecting the hydrogen in a container.

13. The method for producing hydrogen gas and solid carbon of claim 12, wherein passing the hydrocarbon over the waste-product catalyst includes passing natural gas or methane over the waste-product catalyst.

14. The method for producing hydrogen gas and solid carbon of claim 12, further comprising collecting solid carbon deposited on the waste-product catalyst.

15. The method for producing hydrogen gas and solid carbon of claim 12, wherein passing the hydrocarbon over the waste-product catalyst includes passing the hydrocarbon over a catalytic pile of waste-product.

16. The method for producing hydrogen gas and solid carbon of claim 12, wherein passing the hydrocarbon over the waste-product catalyst includes passing the hydrocarbon over the waste-product catalyst that includes:
- a substructure; and
- a layer of waste-product material as an outer layer on the substructure.

17. The method for producing hydrogen gas and solid carbon of claim 12, wherein the waste product catalyst is contained in a reactor.

18. The method for producing hydrogen gas and solid carbon of claim 17, wherein the reactor is a fixed bed, fluidized bed, moving bed, trickle bed, rotating bed, or slurry reactor.

19. The method for producing hydrogen gas and solid carbon of claim 12, further including processing the waste product catalyst into a powder or piece-meal form.

20. The method for producing hydrogen gas and solid carbon of claim 12, wherein the hydrocarbon and waste product catalyst are heated to a temperature of from about 750° C. to about 950° C.

* * * * *